March 27, 1962 C. R. SPERRY ETAL 3,026,589
SLIDE FASTENER
Filed Oct. 20, 1958
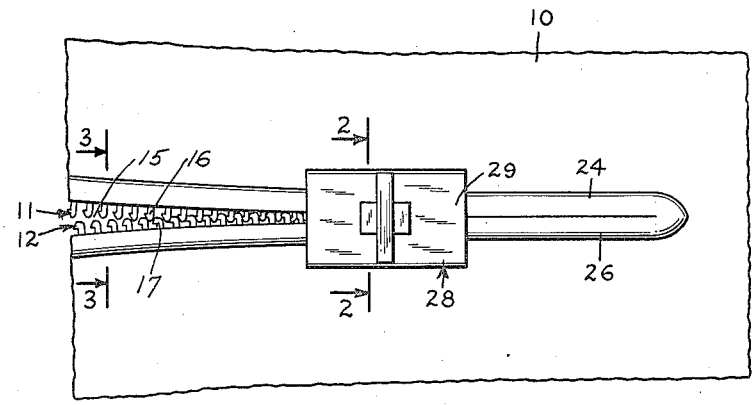
FIG.I.
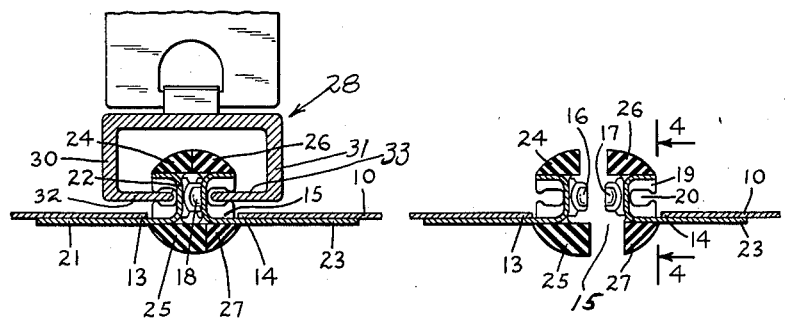
FIG.2.  FIG.3.
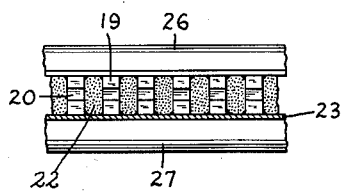
FIG.4.
INVENTORS
CHARLES R. SPERRY.
CARLETON S. MARDEN
by
Brumbaugh, Free, Graves & Donohue
HIS ATTORNEYS

United States Patent Office 3,026,589
Patented Mar. 27, 1962

3,026,589
SLIDE FASTENER
Charles R. Sperry, Cambridge, and Carleton S. Marden, Boston, Mass., assignors to Arthur D. Little, Inc., Cambridge, Mass., a corporation of Massachusetts
Filed Oct. 20, 1958, Ser. No. 768,212
2 Claims. (Cl. 24—205.1)

This invention relates to slide fasteners and it relates particularly to slide fasteners serving as fluid-tight closures for flexible articles which are subjected to fluid pressures during use.

Proposals have been made heretofore for the manufacture of slide fasteners in which the teeth or scoops of the fastener members or stringers are covered and protected by means of overlapping flaps or the like, in order to prevent the passage therethrough of slush, water and the like. Such fastener elements are satisfactory when the fluid coming in contact with the fastener is not subjected to or maintained under pressure as, for example, for use in galoshes and the like. These fasteners are not, however, capable of preventing leakage therethrough of pressurized gases or liquids. For that reason, slide fasteners have not been satisfactory heretofore for such purposes as sealing the entry openings of diving suits, either of the pressurized or unpressurized type, space suits, receptacles or containers which are adapted to receive or to exclude fluids under pressure.

The present invention provides a slide fastener which is capable of providing an effective closure and seal against leakage of liquids or fluids under pressure and hence can be used for opening and closing the openings of articles which are maintained under or subjected to pressure.

One of the problems involved in providing a fastener capable of closing and sealing an opening is to prevent leakage around the slider by means of which the fastening members are engaged and disengaged.

In accordance with the present invention, the fastening members or stringers are mounted along the edges of a slit or opening in an article formed of or including impermeable, flexible material, such as rubber, rubberized fabric or the like, the fastening elements being supported in a web secured to or integral with the edges of the fabric with the web extending between and around the fastening elements in liquid-tight relation thereto. Also, on opposite sides of the fastening elements are flexible lips or flanges formed of resilient material, these lips or flanges being arranged so that when the fastening elements on the opposed edges of the opening are engaged, the lips will be in edge-to-edge engagement to provide an effective seal therebetween.

In order to avoid the need for a slider which extends between the sealing lips and thus tends to promote leakage, in accordance with the present invention the slider straddles or spans the sealing lips or flanges on one side and has edge flanges which are engaged with exposed outer ends of the fastening elements. By appropriately grooving or otherwise forming the outer ends of the fastening elements, the slider is effectively guided with a minimum of frictional resistance so that it can readily close the fastener.

Fasteners of the type embodying the present invention are flexible and can be used with other flexible equipment and are constructed and arranged so that even when substantial twisting or tensioning stresses are exerted on the fastening elements, positive engagement is maintained between at least one set of sealing lips or flanges, thereby preventing leakage through the fastener from one side of the fabric to the other.

For a better understanding of the present invention, reference may be had to the accompanying drawing in which:

FIGURE 1 is a plan view of a portion of a typical slide fastener embodying the present invention;
FIGURE 2 is a view in section taken on line 2—2 of FIGURE 1;
FIGURE 3 is a view in section taken on line 3—3 of FIGURE 1; and
FIGURE 4 is a side elevational view of a portion of the fastener.

For purposes of illustration, the invention will be illustrated as including a tooth or scoop-type fastener, although it will be understood that the invention is applicable to a coil type or similar fastener.

As shown in the drawings, the slide fastener is applied to a piece of flexible impermeable material 10, such as fabric coated with rubber or synthetic rubber, a sheet of rubber or synthetic rubber without fabric reinforcement, or plastic material either fabric reinforced or not, as may be desired.

The fastening members or stringers of the fastener may consist of rows 11 and 12 of teeth or scoops which are disposed along the opposed, internal edges 13 and 14 which define an opening, such as the slit or slot 15 in the article. As best shown in FIGURES 3 and 4, each fastener element 16 or 17 of the fastening members 11 and 12 has a hook-like tooth or scoop portion 18 for engagement in a complemental recess in an adjacent tooth in the usual way. Each tooth has a bifurcated outer end 19 defining a slot 20 or notch having a restricted outer end which serves a purpose to be described hereinafter. Each tooth 16 and 17 of the fastening members 11 and 12 is secured to the piece of material 10 in such a way as to prevent leakage of fluid between the teeth. As shown in FIGURES 2 and 3, this is accomplished by bonding a strip of rubber or other material 21 to the material 10 adjacent the edge 13 to provide an upwardly extending web portion 22 through which the teeth 18 extend. The teeth can be cemented or vulcanized to the web 22 in fluid-tight relation. A similar strip 23 is secured adjacent to the edge 14 and carries the teeth of the fastener member 12.

On opposite sides of each fastener member 11 or 12 are sealing lips or flanges 24, 25, 26 and 27 which, as shown, may be generally quarter round in cross section. The lip or flange 24 is united by vulcanizing or by cementing to the upper edge of the strip 21 and overlies the fastener member 11 throughout its length. Similarly, the quarter round lip or flange 26 is bonded to the upper edge of the strip 23 in a position to abut against the opposing lip 24 when the fastener members are engaged, as best shown in FIGURE 2. Similarly, the lips 25 and 27 are bonded to the strips 21 and 23 inwardly of the fastener elements 11 and 12. As shown in FIGURE 1, the lips 24 and 26 are joined at one or both ends of the opening and may, in fact, be integrally united at both ends. The lips 25 and 27 are similarly united at their ends.

A slider 28 is provided for closing or engaging the fastener members 11 and 12. As shown in FIGURES 1 and 2, the slider includes a generally rectangular top plate 29, downwardly extending side flanges 30 and 31 and inwardly extending bottom flanges 32 and 33 which engage in the notches or grooves 20 in the outer ends of the teeth 16 and 17 of the fastening members. The slider is supported wholly by the teeth and out of engagement with the sealing elements so that it runs freely on the teeth due to the metal-to-metal contact therebetween. In the type of slider shown, the side flanges 30 and 31 do not diverge and in this modification, the slider is used primarily to close or engage the fastening members 11 and 12 and does not aid in opening the fastener. Opening can be accomplished by pulling the fastening members after the slider has been withdrawn. It will be understood, of course, that the slider 28 can be provided with flaring side flanges 30, 31 as in conventional sliders and that the inner edges of the flanges 32 and 33 can be provided with ribs fitting in the notches or slots 20 and thicker than the restricted outer ends of the slots 20 so that the fastening elements can be positively pulled apart by movement of the slider therealong.

The sealing lip construction of the slide fastener described above is unique in that at least one pair of the lips, for example, 24 and 26, will remain in engagement even if the tension exerted, for example, on the material 10 on opposite sides of the opening 15 is sufficient to pull one pair of lips apart. The tension on the fastener will rock the fastener teeth around their axes with the result that if the sealing lips 25 and 27 are separated partially or completely, the sealing lips 24 and 26 will be forced together more tightly thereby enhancing their sealing action.

Similarly, any effort tending to pry the lips 24 and 26 apart when the slide fastener is closed, will force the lips 25 and 27 together more tightly, thereby maintaining the sealing function of the fastener.

While the fastening members 11 and 12 have been described as made up of a row of interlocking teeth which are mounted in webs or strips 22 and 23, it will be understood that the teeth can be mounted on a cord and the cord and teeth may be vulcanized into a rubber or other plastic material of which the sealing lips may form an integral part thereof. With such an arrangement, the tooth and recess portions of the teeth will be exposed between the lips while the outer ends of the teeth will be exposed outwardly of the supporting structure as described above, in order to provide a bearing and guide for the slide.

From the foregoing, it will be apparent that the fastener is susceptible to considerable modification and, therefore, the form of the invention described herein should be considered as illustrative.

We claim:

1. A fluid-tight slide fastener comprising an impermeable article having a pair of opposed internal edges defining an opening in said article, a pair of strips of thin flexible material of U-shaped cross-section, each strip having a pair of spaced apart substantially parallel edge panels joined by a base web having a row of openings therein, one edge panel of one of said strips being united with said article along one of its internal edges, one edge panel of the other strip being united with said article along its other internal edge, a row of fastening elements extending through the openings in each web and sealed in fluid-tight relation thereto, the fastening elements in one web having inner locking portions opposing and engageable with inner locking portions on the fastening elements in the other web, said fastening elements having outer ends disposed outwardly of said webs and between said panels, an elongated lip of resilient material secured to and extending lengthwise of each panel at each edge of said opening, the ends of said lips on corresponding panels being united at opposite ends of said opening, and a slider having edge flanges engaging the outer ends of said fastening elements for guiding said fastening elements into locking engagement, and moving the lips on one U-shaped strip into fluid-tight engagement with the lips on the other U-shaped strip when said fastening elements are in locking engagement, said lips overlying and substantially covering said fastening elements throughout their lengths.

2. The slide fastener set forth in claim 1 in which said fastening elements have notches in their outer ends for receiving said flanges on said slider in sliding relation.

References Cited in the file of this patent
FOREIGN PATENTS

| | | |
|---|---|---|
| 521,275 | Great Britain | May 16, 1940 |
| 534,412 | Great Britain | Mar. 6, 1941 |
| 615,935 | Great Britain | Jan. 13, 1949 |
| 741,033 | Germany | Nov. 3, 1943 |
| 1,164,115 | France | Jan. 10, 1956 |